United States Patent
Viswanathan et al.

(10) Patent No.: US 9,510,130 B2
(45) Date of Patent: Nov. 29, 2016

(54) PROVISIONING OF MULTIPLE WIRELESS DEVICES BY AN ACCESS POINT

(71) Applicants: Prashant Viswanathan, Bangalore (IN); Vishal Batra, Bangalore (IN); Pankaj Vyas, Bangalore (IN)

(72) Inventors: Prashant Viswanathan, Bangalore (IN); Vishal Batra, Bangalore (IN); Pankaj Vyas, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 129 days.

(21) Appl. No.: 14/484,278

(22) Filed: Sep. 12, 2014

(65) Prior Publication Data

US 2016/0080889 A1   Mar. 17, 2016

Related U.S. Application Data

(63) Continuation of application No. 13/902,980, filed on May 28, 2013, now Pat. No. 8,862,096.

(51) Int. Cl.
| | |
|---|---|
| *H04M 1/66* | (2006.01) |
| *H04W 4/00* | (2009.01) |
| *H04W 12/00* | (2009.01) |
| *H04W 84/12* | (2009.01) |
| *H04W 8/20* | (2009.01) |

(52) U.S. Cl.
CPC ............. *H04W 4/001* (2013.01); *H04W 12/00* (2013.01); *H04W 8/20* (2013.01); *H04W 84/12* (2013.01)

(58) Field of Classification Search
CPC .............................. H04W 8/245; H04W 12/06
USPC ................. 455/419, 411, 410; 726/3
See application file for complete search history.

(56) References Cited

U.S. PATENT DOCUMENTS

| | | | | |
|---|---|---|---|---|
| 8,117,445 | B2* | 2/2012 | Werner ................ | H04L 9/0844 713/168 |
| 8,717,931 | B2* | 5/2014 | Taniuchi ............ | H04L 12/5692 370/254 |
| 9,183,380 | B2* | 11/2015 | Qureshi .................. | G06F 21/53 |
| 9,286,471 | B2* | 3/2016 | Qureshi .................. | G06F 21/53 |
| 2008/0092217 | A1* | 4/2008 | Nagami ................ | H04L 9/3271 726/5 |
| 2010/0138926 | A1* | 6/2010 | Kashchenko ........... | G06F 21/74 726/25 |
| 2012/0210397 | A1* | 8/2012 | Suh ........................ | H04W 12/06 726/3 |
| 2012/0331545 | A1* | 12/2012 | Baliga .................. | H04L 63/145 726/15 |
| 2013/0122889 | A1* | 5/2013 | Mueck .................. | H04W 12/08 455/419 |
| 2014/0007222 | A1* | 1/2014 | Qureshi .................. | G06F 21/10 726/16 |

* cited by examiner

*Primary Examiner* — Danh Le
(74) *Attorney, Agent, or Firm* — IPHorizons PLLC; Narendra Reddy Thappeta

(57) ABSTRACT

An aspect of the present disclosure enables an access point (AP) to conveniently provision multiple wireless devices. In an embodiment, the AP may normally operate in a secure mode to disregard non-secure provisioning requests from wireless devices. However, upon receipt of a request to accept provisioning requests from multiple wireless devices, the AP permits multiple wireless devices to be provisioned via the AP, in response to corresponding provisioning requests received from the respective wireless devices. The request to accept may be generated upon pressing of a push button provided on the AP, which may be referred to as a group provisioning button since multiple wireless devices are provisioned in response to pressing of that button.

20 Claims, 6 Drawing Sheets

PROVISIONING OF MULTIPLE WIRELESS DEVICES BY AN ACCESS POINT

RELATED APPLICATIONS

The present application is related to and claims priority from co-pending U.S. Non-provisional patent application entitled, "PROVISIONING OF MULTIPLE WIRELESS DEVICES BY AN ACCESS POINT", application Ser. No. 13/902,980, filed on 28 May, 2013, and is incorporated in its entirety herewith.

BACKGROUND

Technical Field

Embodiments of the present disclosure relate generally to wireless networks, and more specifically to provisioning of multiple wireless devices by an access point.

Related Art

An access point (AP) refers to a switching device, which receives packets from one wireless device and forwards the packet to or towards a target device. The target device is often another wireless device in the same wireless network, though it can be a device connected through a wired network via the access point. The access point communicates with the wireless devices using protocols such as WLAN operating according to IEEE 802.11 standard.

A wireless device generally needs to be provisioned before being able to communicate with other devices via an AP implementing various security measures. Provisioning generally entails configuring (e.g., storing at appropriate locations) the wireless device with various parameters that enable the wireless device to comply with the security measures enforced by the AP. In many WLAN environments the parameters include SSID (Service set identification) of the network and a passphrase, as is well known in the relevant arts.

There are often situations when multiple wireless devices are to be provisioned. For example, a user may purchase multiple WLAN capable devices for home use, and thereafter wish that all these devices be enabled to communicate via a pre-existing AP installed at home. It may be desirable that the user be facilitated to provision all such devices with as less technical knowledge or effort as possible.

WPS (Wi-Fi Protected Setup) is a standard that has been adopted by many vendors of APs and wireless devices, to simplify configuration of a new wireless device in a wireless network at locations such as homes. A push-button mode is one of the approaches defined by WPS, in which a user is normally required to press respective buttons of an AP and a new wireless device (enrollee) within a short duration (typically 2 minutes) such that the AP (or other device operating as a registrar) can automatically provide the configuration information/parameters to the wireless device.

However the push-button mode of operation may require that the user press the respective pair (one on the specific wireless device and the other on the AP) of buttons for configuration of each wireless device. Such an approach may be inconvenient at least in environments where multiple wireless devices are available to be provisioned at the same time.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure enables an access point (AP) to conveniently provision multiple wireless devices. In an embodiment, the AP may normally operate in a secure admission mode to disregard non-secure provisioning requests from wireless devices. Non-secure provisioning requests refer to provisioning requests which are not according to security restrictions imposed by the secure admission mode operative then.

However, upon receipt of a command to accept provisioning requests from multiple wireless devices, the AP permits multiple wireless devices to be provisioned via the AP, in response to corresponding provisioning requests received from the respective wireless devices. The command to accept may be generated upon pressing of a push button (provided on the AP), which may be referred to as a group provisioning button since multiple wireless devices are provisioned in response to pressing of that button.

Several aspects of the disclosure are described below with reference to examples for illustration. It should be understood that numerous specific details, relationships, and methods are set forth to provide a full understanding of the disclosure. One skilled in the relevant arts, however, will readily recognize that the disclosure can be practiced without one or more of the specific details, or with other methods, etc. In other instances, well-known structures or operations are not shown in detail to avoid obscuring the features of the disclosure.

2. Example Environment

Figure 1:
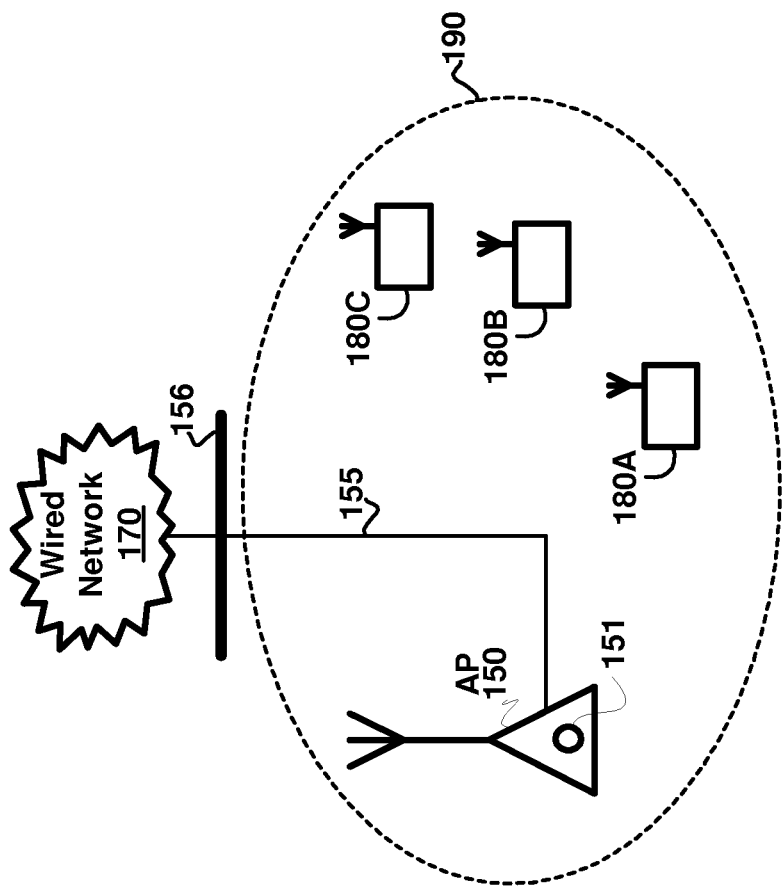
FIG. 1 is a block diagram representing an example environment in which several aspects of the present disclosure can be implemented.
Figure 1:
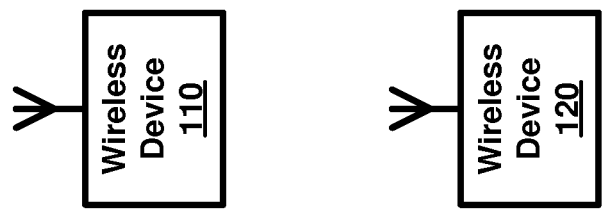

FIG. 1 is a block diagram representing an example environment in which several aspects of the present disclosure can be implemented. The example environment is shown containing only representative systems for illustration. However, real world environments may contain more or fewer systems. FIG. 1 is shown containing wireless devices 110 and 120, access point (AP) 150, WLAN wireless stations (or clients) 180A-180C, wired network backbone 156, and wired network 170. Block 190 represents a basic service set (BSS) consistent with the IEEE 802.11 standard(s). Other environments may include more than one BSS, with the BSSs being interconnected to form an extended service set (ESS) consistent with IEEE 802.11 standards.

Each of clients 180A-180C is designed to operate as wireless stations consistent with IEEE 802.11 (WLAN) family of standards (including IEEE 802.11a, 802.11b, 802.11g and 802.11n), and may communicate, via AP 150, with each other as well as with devices/systems on wired network 170. It is assumed that client's 180A-180C are already provisioned to communicate securely via AP 150. Client's 180A-180C may correspond, for example, to laptop computers, smart phones, or wireless sensors.

AP 150 represents a switch/hub operating according to IEEE 802.11 family of standards, and enables associated wireless stations (e.g., 180A-180C) to communicate with each other as well as with systems connected to wired network 170. AP 150 is connected by a wired medium (155) to wired network backbone 156, and thus to wired network 170. Wired network 170 may represent the internet, also known as the World Wide Web. AP 150 is shown containing push button 151, which may be used when provisioning wireless devices, as described below. AP 150 is implemented to contain a push-button 151, which may be pressed to allow AP 150 to accept (and later service) provisioning requests from not-yet-provisioned wireless devices such as wireless devices 110 and 120.

Wireless devices 110 and 120 represent devices that are capable of communicating wirelessly according to IEEE 802.11 standards. In an embodiment, wireless devices 110 and 120 are implemented to operate as wireless stations (clients).

Each of wireless devices 110 and 120 may have a core functionality (e.g., operation as a smart meter, sensor, etc), and the wireless communication capability according to IEEE 802.11 can be used to communicate various data and control parameters of interest with other devices via an AP (for example, AP 150). However, before wireless devices 110 and 120 can perform such communication, wireless devices 110 and 120 may need to be provisioned.

As noted above, provisioning generally entails configuring the wireless devices with various parameters that enable the wireless devices to comply with the security measures enforced by an AP, in addition to specifying the particular AP with which to associate and thereafter communicate with other devices. The configuration parameters include SSID (Service Set Identification) of the network (BSS 190) and a passphrase, as is well known in the relevant arts. For conciseness only two wireless devices 110 and 120 are shown and described as requiring provisioning. However, there may be more than two wireless devices that may need to be provisioned.

As noted above, there may be situations in which a user may need to be facilitated to provision wireless devices 110 and 120 with as less technical knowledge or effort as possible. Wireless devices 110 and 120 may be headless devices, i.e., devices with no or minimal user interface (including push-buttons). Again, as noted above, WPS push-button configuration may not be possible or convenient in many scenarios, including that of FIG. 1, where multiple wireless devices need provisioning.

The manner in which multiple wireless devices are conveniently provisioned is illustrated next with respect to a flowchart.

3. Convenient Provisioning of Multiple Wireless Devices

Figure 2:
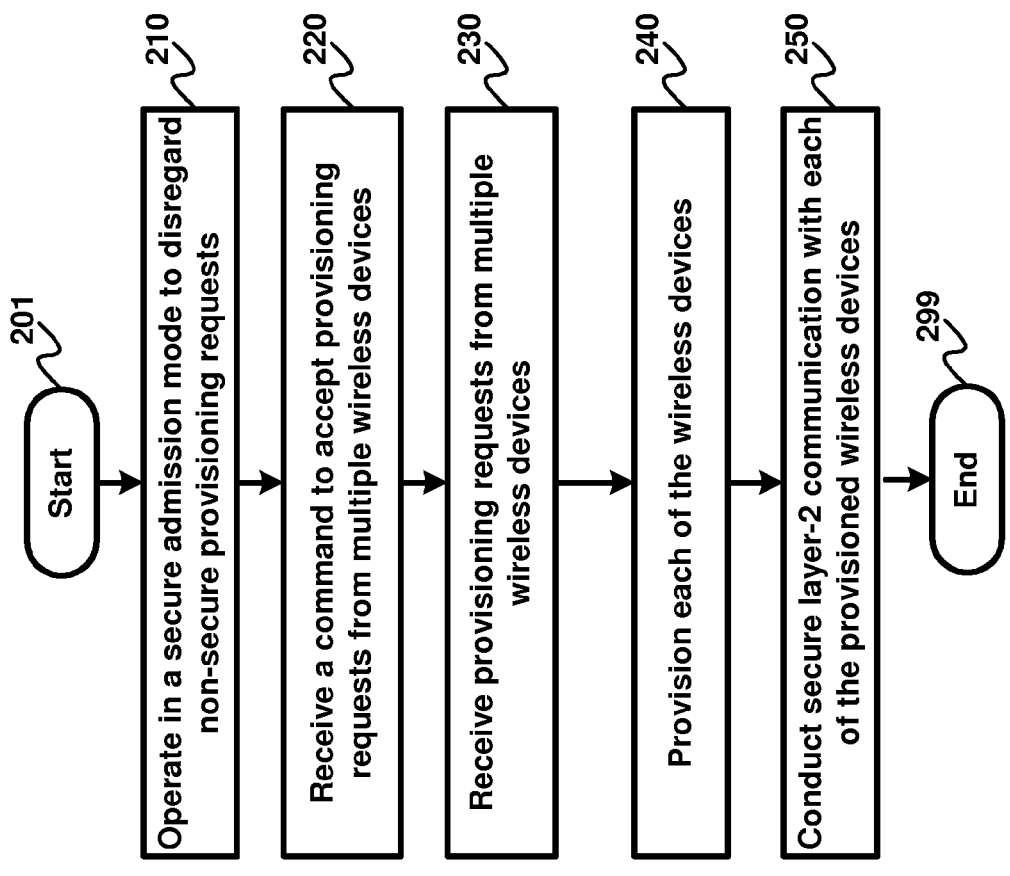
FIG. 2 is a flowchart illustrating the manner in which multiple wireless devices can be conveniently provisioned, in an embodiment.

FIG. 2 is a flowchart illustrating the manner in which multiple wireless devices can be conveniently provisioned, in an embodiment. The flowchart is described with respect to the environment of FIG. 1 and AP 150, merely for illustration. However, various features described herein can be implemented in other environments and using other components as well, as will be apparent to one skilled in the relevant arts by reading the disclosure provided herein.

Further, the steps in the flowchart are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts in step 201, in which control passes immediately to step 210.

In step 210, access point 150 operates in a secure admission mode to disregard non-secure provisioning requests from wireless devices. Operation in a secure admission mode implies that not all the admission/provisioning requests are honored, and only those requests that are in accordance with specific secure provisioning approaches (e.g., those specified by WPS) are processed/permitted.

Thus, even if AP 150 were to receive non-secure provisioning requests from wireless devices 110 and 120 when AP 150 is in the secure mode, access point 150 would ignore (disregard) such provisioning requests as not conforming to the security policies required by the secure admission mode (assuming they are not initiated in accordance with corresponding secure provisioning approaches). As a result, the wireless devices sending the non-secure provisioning requests would not be provisioned.

In step 220, access point 150 receives a command to accept provisioning requests from multiple wireless devices. The command can be received in any of multiple forms, as suitable in corresponding environments. For example, a push button (e.g., button 151) may be provided on access point 150, the pressing/actuation of which may represent the command. Alternatively, an external packet/signal according to a suitable convention may represent such a command.

In step 230, access point 150 receives provisioning requests, from each of corresponding ones of multiple wireless devices (e.g., wireless devices 110 and 120 of FIG. 1). In step 240, access point 150 provisions each of the wireless devices, in response to the corresponding provisioning request. It may be observed that access point 150 cooperates in such provisioning in view of the command of step 220, but would otherwise disregard such requests in view of operation of step 210.

In step 250, access point 150 conducts secure layer-2 communication with each of the provisioned wireless devices. Such communication implies that the packets on the wireless medium are in encrypted form, and the information exchanged during provisioning forms the basis for encryption and decryption. The secure communication is enabled due to the provisioning of the wireless devices in step 240. Such communication can be the basis for communicating with other wireless devices in the same/different BSS or those connected via wired network 170, as noted above. The flow chart ends in step 299.

Thus, according to an aspect of the present disclosure, multiple wireless devices are provisioned in response to a single command to accept provisioning requests (e.g., by pressing a 'group provisioning' button (151) on an AP). Such 'group provisioning' may enable a user to have multiple devices provisioned with minimal effort when all such devices are available for being provisioned at the same time.

The details of message-exchanges that occur in provisioning multiple wireless devices in an example embodiment are described next.

4. Messages

Figure 3:
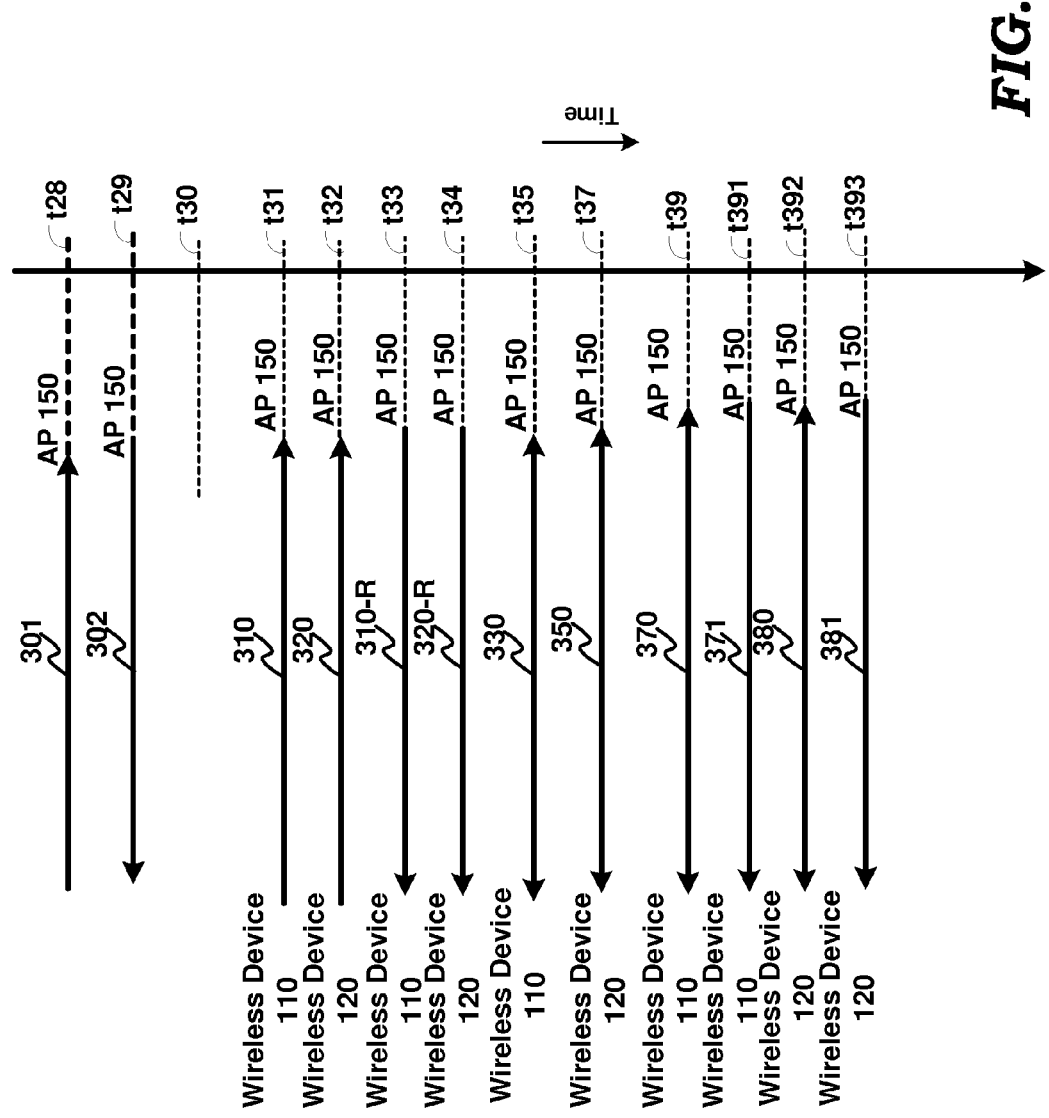
FIG. 3 is a diagram illustrating the sequence of messages exchanged between wireless devices and an access point in provisioning the wireless devices, in an embodiment.

FIG. 3 is a diagram illustrating the sequence of messages exchanged (in an embodiment) between wireless devices 110 and 120 and AP 150 in provisioning wireless devices 110 and 120 as described above with respect to flowchart of FIG. 2. The direction of flow of time in FIG. 3 is indicated by the vertical arrows.

A non-secure provisioning request 301 is shown received at time instance t28. As noted above, non-secure implies that the received request is not according to the security restrictions imposed by the admission mode operative in that duration in access point 150. Accordingly, access point 150 is shown sending a 'provisioning denied' response (302) at time instance t29.

Button 151 is pressed at time instant t30. The pressing of button 151 sets AP 150 to a 'group provisioning' mode, in which AP 150 is responsive to non-secure provisioning requests from compatible wireless devices (such as wireless device 110 and 120). Thus, time instance t30 represents a transition point at which requests such as 301 would henceforth be processed for successful provisioning, as described below.

At t31, wireless device 110 broadcasts probe request frame 310, with the vendor specific information elements (IE) in message 310 indicating that wireless device 110 is requesting to be provisioned. Probe request frame format is described in detail in section 7.2.3.8 "Probe Request frame format" of IEEE Std 802.11™-2007 available from IEEE. Vendor-Specific IE is described in section 7.3.2.26 "Vendor Specific information element" of IEEE Std 802.11™-2007 available from IEEE. In an embodiment, the vendor specific IE contains the text "Wireless Device 110 —need provisioning", which specifies to AP 150 that wireless device 110 is requesting for being provisioned. The message, being proprietary, also indicates to AP 150 that wireless device 110 is a 'compatible' device (e.g., made by the same manufacturer as AP 150).

At t32, wireless device 120 broadcasts probe request frame 320, with the vendor specific information elements (IE) in message 320 indicating that wireless device 110 is requesting to be provisioned. In an embodiment, the vendor specific IE contains the text "Wireless Device 120 —need provisioning", which specifies to AP 150 that wireless device 120 is requesting for being provisioned, and also that wireless device is a compatible device.

In response to the receipt of messages 310 and 320, AP 150 sequentially (one after the other) transmits respective probe response frames 310-R (at t33) and 320-R (at t34) to wireless devices 110 and 120 respectively. Frames 310-R and 320-R indicate to wireless devices 110 and 120 respectively, the capability information, supported data rates, etc. of AP 150, thereby enabling wireless devices 110 and 120 to potentially associate with AP 150. In particular, each of probe response frames 310-R and 320-R contains vendor specific IE indicating that the respective wireless devices 110 and 120 should associate with AP 150. Probe response frames are defined in section 7.2.3.9 Probe Response frame format of IEEE Std 802.11™-2007 available from IEEE. Message 310-R is shown as being transmitted after the receipt of message 320 merely for illustration, and AP 150 may instead transmit message 310-R immediately after receipt of message 310 also. Further, while message 320-R is shown as being transmitted later than message 310-R, the reverse order is also possible, i.e., AP 150 may transmit message 320-R first, and then transmit message 310-R.

In an alternative embodiment, instead of probe response frames 310-R and 320-R, AP 150 broadcasts respective beacon frames with vendor-specific information fields in the beacon frames indicating the capability information, supported data rates, etc. In particular, each of such beacon frames would contain vendor specific IE indicating that the respective wireless devices 110 and 120 should associate with AP 150. Beacon frames are defined in section 7.2.3.1 "Beacon frame format" of IEEE Std 802.11™-2007 available from IEEE.

At t35, wireless device 110 joins BSS 190 without providing any security credentials to AP 150, thereby establishing non-secure layer-2 connectivity with AP 150. The joining may involve the transmission from wireless device 110 of an authentication frame and an association frame to AP 150, with AP 150 transmitting an authentication frame (indicating acceptance of the authentication) and association response frame respectively back to wireless device 110. The exchange of the authentication frames and association request/association response frames between wireless device 110 and AP 150 is represented by messages 330 and the double-ended arrow shown at t35. AP 150 permits wireless device 110 to join BSS 190 without requiring any security credentials from wireless device 110 since AP 150 has been set to a group provisioning mode, in which AP 150 is designed to honor non-secure provisioning requests from wireless devices.

Similarly, at t37, wireless device 120 joins BSS 190 without providing any security credentials to AP 150, thereby establishing non-secure layer-2 connectivity with AP 150. The joining may involve the transmission from wireless device 110 of an authentication frame and an association frame to AP 150, with AP 150 transmitting an authentication frame (indicating acceptance of the authentication) and association response frame respectively back to wireless device 110. The exchange of the authentication frames and association request/association response frames between wireless device 120 and AP 150 is represented by messages 350 and the double-ended arrow shown at t37. Again, AP 150 permits wireless device 110 to join BSS 190 without requiring any security credentials from wireless device 120 since AP 150 has been set to a group provisioning mode, in which AP 150 is designed to honor non-secure provisioning requests from wireless devices.

Authentication frame format is defined in section 7.2.3.10 'Authentication frame format' of IEEE Std 802.11™-2007 specification. Association request frames are defined in section 7.2.3.4 'Association Request frame format' of IEEE Std 802.11™-2007 available from IEEE. Association response frames are defined in section 7.2.3.5 'Association Response frame format' of IEEE Std 802.11™-2007 available from IEEE. AP 150 may store corresponding association IDs (identifiers) of wireless devices 110 and 120, which are generated by AP 150.

Having thus joined BSS 190, each of the devices 110 and 120 may communicate non-securely with AP 150. However, AP 150 is designed to disallow wireless devices 110 and/or 120 from being able to communicate with other devices (either within BSS 190 or those in wired network 170) till security credentials are provided by each of devices 110/120 to AP 150, as described below.

At t39, wireless device 110 establishes a secure channel above layer-2 with AP 150. The establishment of the secure channel may involve exchange of one or more messages (indicated as 370) between AP 150 and wireless device 110. In an embodiment, the establishment of the secure channel noted above is performed according to the approach of Secure Socket Layer (SSL) or Transport Layer Security (TLS), described in detail in RFC 5246: The Transport Layer Security (TLS) Protocol Version 1.2. At t391, wireless device 110 receives layer-2 security credentials (indicated as 371) from AP 150 over the secure channel established at t39.

At t392, wireless device 120 establishes a secure channel above layer-2 with AP 150. The establishment of the secure channel may involve exchange of one or more messages (indicated as 380) between AP 150 and wireless device 110. At t393, wireless device 120 receives layer-2 security credentials (indicated as 381) from AP 150 over the secure channel established at t392. The establishment of the secure channels noted above may be performed according to the approach of Secure Socket Layer (SSL) or Transport Layer Security (TLS).

The layer-2 security credentials noted above may be designed according to the approach of Wi-Fi Protected Access (WPA), Wi-Fi Protected Access II (WPA2), etc. The layer-2 credentials may include a passphrase from which encrypt and decrypt keys may be derived for encrypting and decrypting data packets for future secure communications.

In another embodiment, AP 150 grants the security credentials to each of wireless devices 110 and 120 only after further authentication, for example, involving user approval or verification with a back-end authentication server.

Having thus obtained the layer-2 security credentials at t391, wireless device 110 disconnects from AP 150, and subsequently reconnects (establishes layer 2 connectivity/re-associates, although not indicated in FIG. 3) with AP 150 using the layer-2 security credentials obtained as noted above. The reconnection may involve joining BSS 190 in a secure manner in accordance with WPA/WPA2. After such reconnection/re-association, AP 150 and wireless device 110 may conduct secure layer-2 communication. Encryption and decryption for such secure layer-2 communication may be based on encrypt and decrypt keys derived from the security credentials (e.g., passphrase) obtained by wireless device 110.

Similarly, having obtained the layer-2 security credentials at t393, wireless device 120 disconnects from AP 150, and subsequently reconnects (not indicated in FIG. 3) with AP 150 using the layer-2 security credentials obtained earlier. After such reconnection/re-association, AP 150 and wireless device 120 may conduct secure layer-2 communication. Encryption and decryption for such secure layer-2 communication may be based on encrypt and decrypt keys derived from the security credentials (e.g., passphrase) obtained by wireless device 120.

It may be observed that according to the sequence of FIG. 3, the initial association (via the corresponding messages 330, 340, 350 and 360) of each of wireless devices 110 and 120 with AP 150 is merely to establish a secure channel with the AP 150 in order to obtain layer-2 security credentials over a secure channel. The wireless devices 110 and 120 then each re-connect (re-associate) with AP 150 using the obtained layer-2 credentials. Once thus re-connected, AP 150 may allow the wireless device (e.g., wireless device 110 and 120) unrestricted communication access (to exchange data packets) to other devices in BSS 190 and/or with devices in wired network 170.

It may be appreciated that wireless devices may thus be provisioned automatically and without the need for any provisioning agent. Further, the provisioning does not use WPS (Wifi Protected Setup) and thus does not require push buttons on the wireless devices, which may thus be implemented with minimal or no user interface. Further, a one-time pressing of button 151 on AP 150 enables provisioning of multiple wireless devices (though only two devices are described above for illustration). This is in contrast, for example, to the push button mode of WPS, which requires the corresponding push button to be pressed once for provisioning each device.

It should be appreciated that access point 150 may continue to provision other wireless devices in accordance with step 240 if corresponding requests are received within a pre-specified (by appropriate configuration) duration of t30. In the illustrative example of FIG. 3, such duration covers at least t30-t32. A user is accordingly provided control as to the specific durations in which non-secure provisioning requests can be honored in accordance with the features described herein.

The description is continued with respect to the internal details of AP 150 in an embodiment.

5. Access Point

Figure 4:
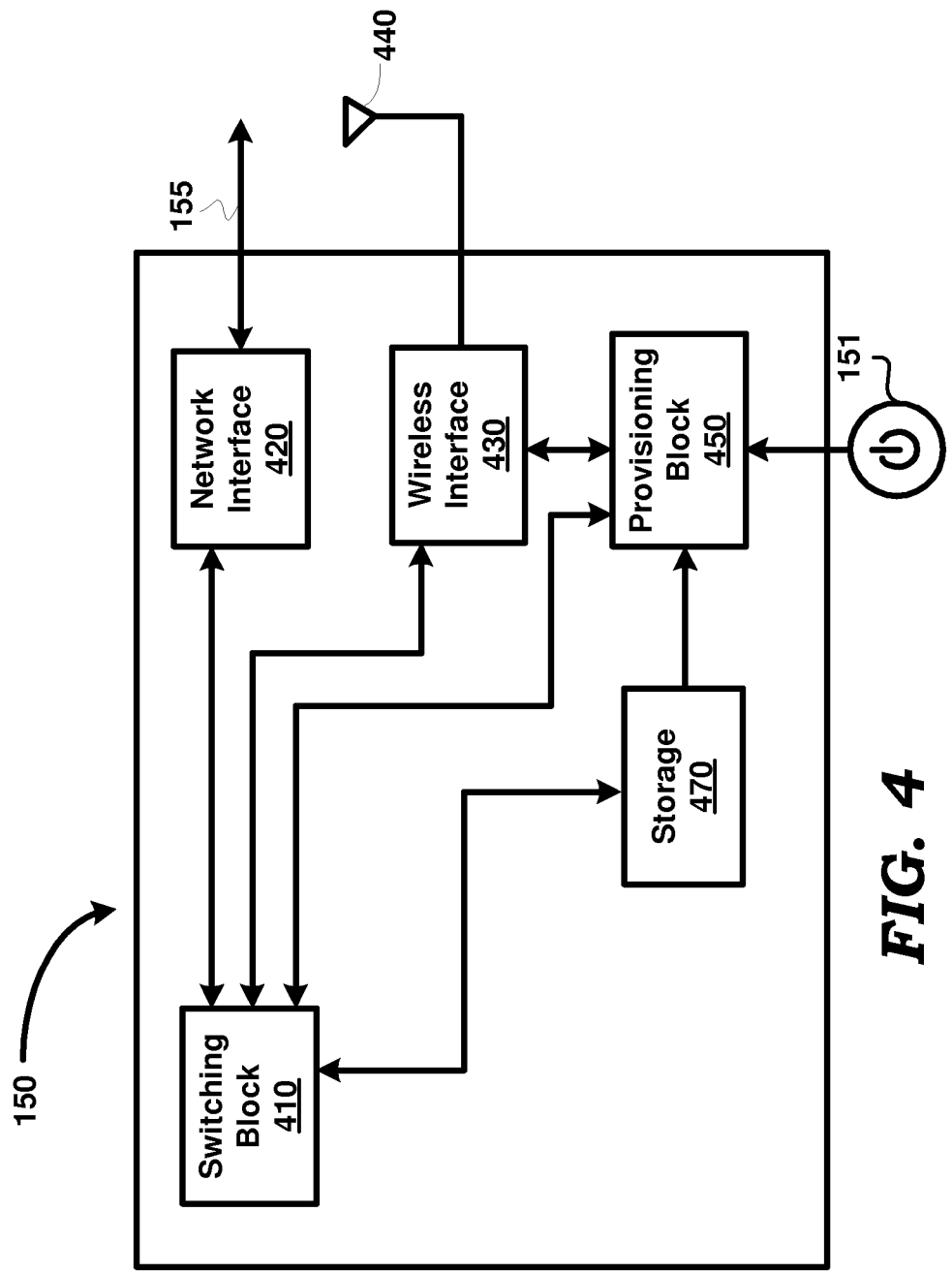
FIG. 4 is a block diagram of the internal details of an access point, in an embodiment

FIG. 4 is a block diagram illustrating the internal blocks of AP 150, in an embodiment. AP 150 is shown containing switching block 410, network interface 420, wireless interface 430, antenna 440, provisioning block 450, storage 470, and push-button 151.

Push button 151 is a button, which when pressed provides to provisioning block 450 a signal representing a command (to AP 150) to accept provisioning requests from multiple wireless devices, as noted with respect to step 220 of the flowchart of FIG. 2. In one embodiment, push button 151 can be operated in two modes. In a first mode, for example, using a simple/short push, access point 150 is placed to operate in WPS push button mode to provision a single device. In a second mode, for example, upon an extended push (say, for more than 5 seconds continuously), access point 150 operates in a group provisioning mode as described above with respect to FIGS. 2 and 3. The extended push represents the command noted in step 220.

Network interface 420 provides connectivity to a network (e.g., using Internet Protocol), and may be used to enable AP 150 as well as wireless devices in BSS 190 to communicate (via path 155) with other systems connected to wired network 170 of FIG. 1. Wireless interface 430 provides the hardware, software and firmware that enable AP 150 to communicate wirelessly (via antenna 440) according to IEEE 802.11 standards.

Storage 470 contains both volatile and non-volatile storage required for operation of various blocks of AP 150. The non-volatile storage may be used to store the SSID of BSS 190 and security credentials (which may include a passphrase) which may need to be provided/transmitted to a wireless device that is to be provisioned. Storage 470 may store the encrypt/decrypt keys that would be required to encode/decode data transmitted to/received from each of the multiple wireless devices provisioned using AP 150. The passphrase is typically the same for all wireless devices in the network. However, according to 802.11 standards, the encrypt/decrypt keys, which are derived from the passphrase, are typically different for each wireless device. The non-volatile memory may also store various instructions. The volatile memory contains randomly accessible locations that are used for storing data/instructions, which are used during operation of AP 150.

Switching block 410 operates to provide the features of an access point according to IEEE 802.11 standards. Thus, in conjunction with wireless interface 430, switching block 410 may broadcast beacon frames, receive data packets from one wireless station and forward the packets with the corresponding address of another wireless station, etc, as required by an access point. Switching block 410 may decode each received packet using the keys derived from the security credentials previously sent to the specific source wireless station from which the packet is received. The content/packets may again be encrypted using the keys derived from the security credentials previously sent to the target wireless station to which the received packet is to be delivered.

Switching block 410 thus enables associated wireless stations to communicate (securely) with each other. Switching block 410, in conjunction with network interface 420, enables wireless devices associated with AP 150 to communicate with devices on wired networks such as wired network 170 (shown in FIG. 1). Switching block 410 may use the randomly accessible portion of storage 470 to store (and later retrieve) temporary data.

In an embodiment, switching block 410 receives from provisioning block 450 a list of wireless devices that have requested provisioning. Switching block 410 provides, via network interface 420, a web page containing the list of the wireless devices. A user (e.g., at a remote system in wired network 170) may then select the specific ones of the wireless devices that is allowed to be provisioned, i.e., provided with the SSID and corresponding passphrase required for secure provisioning.

Alternatively, switching block 410 may communicate with a back-end authentication server (not shown) via network interface 420 to obtain the list of wireless devices that are allowed to be provisioned. The backend authentication server may be configured with identities of various devices that can be provisioned using the approach described herein. In either case, switching block 410 forwards the selection (of the list of wireless devices that are approved for being provisioned) to provisioning block 450.

Provisioning block 450 operates to enable provisioning of wireless devices as described in detail above. Provisioning block 450 is designed to ignore provisioning requests (received via wireless interface 430) from wireless devices unless/until provisioning block 450 receives/has received a command to accept (otherwise considered non-secure) provisioning requests. Thus, the operation of provisioning block 450 causes AP 150 to be either in a secure or non-secure admission mode.

In an embodiment, a command to accept provisioning requests is indicated by the pressing of group provisioning button 151. In an alternative embodiment, the command to accept provisioning requests may be provided in the form of a signal/packet received from a system external to AP 150. For example, the command may be received by switching block 410 via network interface 420, and forwarded to provisioning block 450 by switching block 410. Irrespective of the manner in which the command is received, provisioning block 450 may then transmit the respective messages in response to the received messages indicated in FIG. 3 to cause the corresponding wireless device(s) to be provisioned.

During provisioning, and once a secure communication channel has been setup between AP 150 and a wireless device that is being provisioned, provisioning block 450 retrieves the SSID (Service Set Identifier) and security credentials (noted above) from storage 470, and causes the SSID and security credentials to be transmitted to the wireless device via wireless interface 430. In an embodiment, provisioning block 450 obtains from switching block 410, an approved list of wireless devices that are allowed to be provisioned, and provisions only the approved wireless devices.

Figure 5:
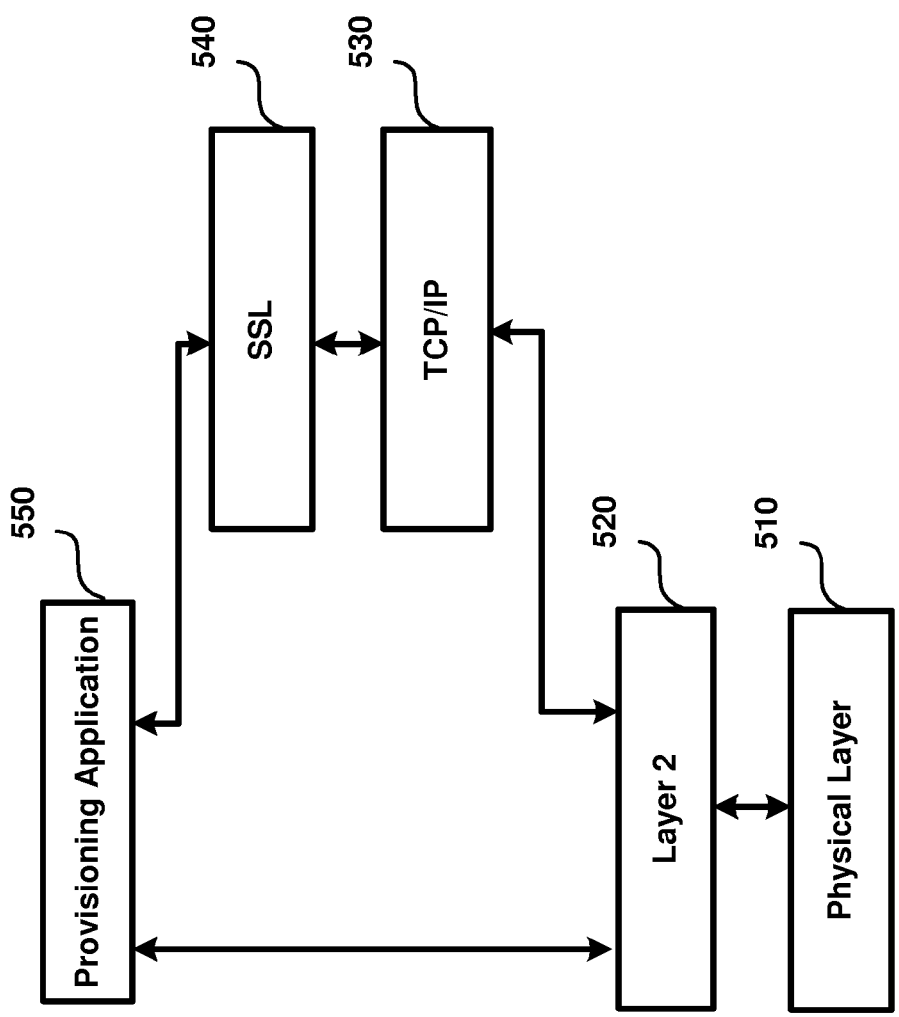
FIG. 5 is a diagram illustrating the various communication layers operative in an access point in provisioning a wireless device, in an embodiment.

FIG. 5 is a diagram illustrating the various communication layers operative in AP 150 in provisioning a wireless device. Physical layer 510 represents the electrical and protocol interfaces provided in AP 150 to enable AP 150 to communicate according to WLAN.

Layer-2 520 represents the medium access control (MAC) layer of AP 150. Layer-2 520 operates initially in a secure admission mode to disregard provisioning requests from wireless devices. However, upon receipt of indication that group button 151 has been pressed, layer-2 520 permits a connection to be established in non-secure mode, i.e., without requiring any security credentials (such as password, for authentication).

TCP/IP layer 530 represents the transport/network layers of AP 150, and can be implemented in a known way. Secure Sockets Layer (SSL) 540 (also termed Transport Layer Security) represents a layer that provides cryptographic protocols for communication security over the internet, and as noted above is described in detail in RFC 5246.

Provisioning application layer 550 represents an application layer that performs the operations involved in provisioning a wireless device as described in detail above. Provisioning application 550 may correspond to provisioning block 450 of FIG. 4. In particular, layer 550 operates in a secure admission mode to disregard non-secure provisioning requests (without appropriate security credentials), and admit secure provisioning requests (e.g., those based on WPS) from wireless devices in a normal stage of operation.

However, once an indication of pressing of button 151 is received, layer 550 operates via SSL 540 and TCP/IP 530 layers to provision each of a group of devices from which provisioning requests are received. As noted above, connection is established with each device using a non-secure approach, and thereafter the SSL/TCP/IP layers operate to provide a secure channel to transfer secure credentials.

A wireless device to be provisioned (e.g., devices 110 and 120) may be implemented to have similar communication layers.

The description is continued with respect to details of AP 150 in an embodiment in which various aspects of the present disclosure are operative by execution of appropriate executable modules.

6. Digital Processing System

Figure 6:
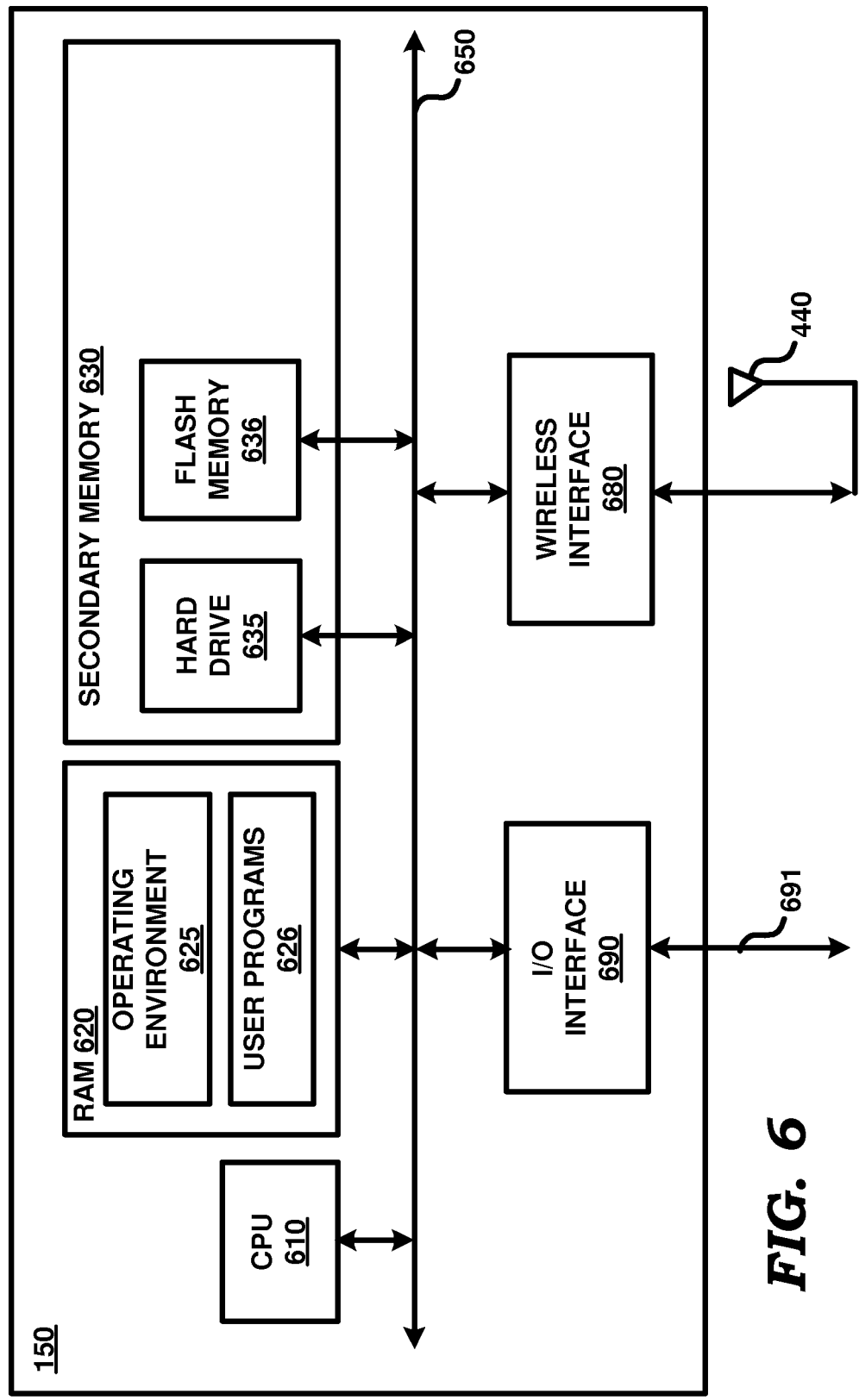
FIG. 6 is a block diagram illustrating the details of a wireless device in an embodiment in which various aspects of the present disclosure are operative by execution of appropriate executable modules.

FIG. 6 is a more detailed block diagram illustrating the details of AP 150 in an embodiment in which various aspects of the present disclosure are operative by execution of appropriate executable modules. AP 150 may contain one or more processors such as a central processing unit (CPU) 610, random access memory (RAM) 620, secondary memory 630, wireless interface 680 and other interfaces 690. All the components may communicate with each other over communication path 650, which may contain several buses as is well known in the relevant arts.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 (non-transitory/non-volatile machine readable storage medium) via communication path 650. RAM 620 is shown currently containing software instructions constituting operating environment 625 and/or other code/programs 626. In addition to operating system 625, RAM 620 may contain other software programs such as device drivers, etc., which provide a (common) run time environment for execution of code/programs/applications (in the form of execution entities).

Secondary memory 630 is shown containing hard drive 635 and flash memory 636. Secondary memory 630 stores data and software instructions (code), which enable AP 150 to provision multiple wireless devices in accordance with the present disclosure. In addition, secondary memory 630 may contain code to enable AP 150 to operate as an access point according to WLAN standards, and to provide user-level features as well. The software instructions (and additionally data) may either be copied to RAM 620 prior to execution by CPU 610, or may be executed directly from flash memory 636.

Wireless interface 680 corresponds to wireless interface 430 of FIG. 4. Input-output (I/O) interface 690 enables users to provide inputs to as well as receive outputs from AP 150. Button 151 (not shown) may be connected on path 691.

7. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of provisioning multiple wireless devices, said method being performed in an access point (AP), said method comprising:

operating in a secure mode to disregard a first plurality of non-secure provisioning requests from wireless devices, but accept secure provisioning requests in view of operating in said secure mode;

receiving, after said operating, a first command to accept non-secure provisioning requests from multiple wireless devices;

receiving a second plurality of non-secure provisioning requests from respective ones of multiple wireless devices, after receipt of said first command;

provisioning, by said AP, each of said multiple wireless devices in response to the corresponding non-secure provisioning request of said second plurality of non-secure provisioning requests, in view of having received said first command, wherein said provisioning comprises providing parameters which enable each of said multiple wireless devices to comply with security measures enforced by said AP to operate in said secure mode; and conducting secure layer-2 communication in said secure mode with each of the provisioned wireless devices, based on said parameters provided as a part of said provisioning.

2. The method of claim 1, wherein said first command is generated by the pressing of a push button provided on said AP, whereby said multiple wireless devices are provisioned upon receiving a signal indicating pressing of said push button provided on said AP.

3. The method of claim 1, wherein said first command is generated by a device external to said AP.

4. The method of claim 1, wherein said provisioning of each of said wireless devices comprises:

allowing the wireless device to associate with said AP according to a non-secure approach requiring no security credentials to establish non-secure layer-2 connectivity;

establishing a secure channel over said non-secure layer-2 connectivity, said secure channel being provided on a layer above said layer-2; and transferring security credentials of said AP to the wireless device over said secure channel.

5. The method of claim 4, wherein said secure channel is implemented using SSL on TCP/IP layer.

6. The method of claim 1, wherein each of said provisioning requests is received in a vendor specific information element of a probe request frame.

7. The method of claim 6, wherein said method further comprises responding to each of said provisioning requests with a probe response frame, wherein contents of said probe response frame enables the corresponding wireless device to be associated with said AP without providing any security credentials.

8. The method of claim 4, wherein said provisioning further comprises:

transmitting a list of said multiple wireless devices to an external system; and receiving from said external system an indication of a set of authorized wireless devices in said multiple wireless devices that are allowed to be provisioned, wherein said establishing and said transferring are performed only for the set of authorized wireless devices specified in said indication.

9. A non-transitory machine readable storage medium storing one or more sequences of instructions in an access point (AP) for provisioning multiple wireless devices, wherein execution of said one or more sequences of instructions by one or more processors contained in said AP enables said AP to perform the actions of:

operating in a secure mode to disregard a first plurality of non-secure provisioning requests from wireless devices, but accept secure provisioning requests in view of operating in said secure mode;

receiving, after said operating, a first command to accept non-secure provisioning requests from multiple wireless devices;

receiving a second plurality of non-secure provisioning requests from respective ones of multiple wireless devices, after receipt of said first command;

provisioning, by said AP, each of said multiple wireless devices in response to the corresponding non-secure provisioning request of said second plurality of non-secure provisioning requests, in view of having received said first command, wherein said provisioning comprises providing parameters which enable each of said multiple wireless devices to comply with security measures enforced by said AP to operate in said secure mode; and conducting secure layer-2 communication in said secure mode with each of the provisioned wireless devices, based on said parameters provided as a part of said provisioning.

10. The non-transitory machine readable storage medium of claim 9, wherein said first command is generated by the pressing of a push button provided on said AP.

11. The non-transitory machine readable storage medium of claim 9, wherein said first command is generated by a device external to said AP.

12. The non-transitory machine readable storage medium of claim 9, wherein said provisioning of each of said wireless devices comprises:
   allowing the wireless device to associate with said AP according to a non-secure approach requiring no security credentials to establish non-secure layer-2 connectivity;
   establishing a secure channel over said non-secure layer-2 connectivity; and
   transferring security credentials of said AP to the wireless device over said secure channel.

13. The non-transitory machine readable storage medium of claim 12, wherein said secure channel is implemented using SSL on TCP/IP layer.

14. The non-transitory machine readable storage medium of claim 9, wherein each of said provisioning requests is received in a vendor specific information element of a probe request frame.

15. The non-transitory machine readable storage medium of claim 14, further comprising instructions for causing said AP to:
   respond to each of said provisioning requests with a probe response frame, wherein contents of said probe response frame enables the corresponding wireless device to be associated with said AP without providing any security credentials.

16. The non-transitory machine readable storage medium of claim 12, further comprising instructions for causing said AP to:
   transmit a list of said multiple wireless devices to an external system; and
   receive, from said external system, an indication of a set of authorized wireless devices in said multiple wireless devices that are allowed to be provisioned,
   wherein said establishing and said transferring are performed only for the set of authorized wireless devices specified in said indication.

17. A system comprising:
   a plurality of wireless devices; and
   an access point (AP) to provision each of said plurality of wireless devices, said AP comprising:
      a wireless interface enabled to receive provisioning requests from each of said plurality of wireless devices; and
      a provisioning block enabled to:
         operate in a secure mode to disregard a first plurality of non-secure provisioning requests from respective wireless devices, but accept secure provisioning requests in view of operating in said secure mode;
         receive a first command to accept non-secure provisioning requests from said plurality of wireless devices;
         receive a second plurality of non-secure provisioning requests from respective ones of said plurality of wireless devices, after receipt of said first command;
         provisioning, by said AP, each of said plurality of wireless devices in response to the corresponding non-secure provisioning request, in view of having received said first command, wherein said provisioning comprises providing parameters which enable each of said multiple wireless devices to comply with security measures enforced by said AP to operate in said secure mode; and
         conducting secure layer-2 communication in said secure mode with each of the provisioned wireless devices, based on said parameters provided as a part of said provisioning.

18. The system of claim 17, wherein said provisioning block is coupled to a push button, wherein pressing of said push button generates said first command.

19. The system of claim 18, wherein to provision each of said plurality of wireless devices, said provisioning block is enabled to:
   allow a wireless device in said plurality of wireless devices to associate with said AP according to a non-secure approach requiring no security credentials to establish non-secure layer-2 connectivity;
   participate in the establishment of a secure channel over said non-secure layer-2 connectivity; and
   transfer security credentials of said AP to said wireless device over said secure channel.

20. The system of claim 19, wherein said provisioning block establishes said secure channel using SSL on TCP/IP layer.

* * * * *